(12) United States Patent
Dunn

(10) Patent No.: US 8,156,726 B1
(45) Date of Patent: Apr. 17, 2012

(54) SEMICLOSED BRAYTON CYCLE POWER SYSTEM WITH DIRECT COMBUSTION HEAT TRANSFER

(75) Inventor: Paul M. Dunn, Wakefield, RI (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 07/926,115

(22) Filed: Aug. 7, 1992

(51) Int. Cl.
*F02C 7/10* (2006.01)

(52) U.S. Cl. ........................................ 60/39.511; 60/39.5

(58) Field of Classification Search ................ 60/39.02, 60/39.05, 39.461, 39.511, 727
See application file for complete search history.

(56) References Cited

U.S. PATENT DOCUMENTS

| | | | | |
|---|---|---|---|---|
| 1,688,761 A | * | 10/1928 | Sperry ........................ | 60/39.05 |
| 2,303,381 A | * | 12/1942 | New ............................ | 60/39.02 |
| 2,325,619 A | * | 8/1943 | Lysholm ..................... | 60/39.05 |
| 3,101,592 A | * | 8/1963 | Robertson et al. .......... | 60/39.05 |
| 3,134,228 A | * | 5/1964 | Wolousky et al. ........ | 60/39.461 |
| 3,657,879 A | * | 4/1972 | Ewbank et al. ............ | 60/39.05 |
| 3,877,218 A | * | 4/1975 | Nebgen ....................... | 60/39.05 |
| 5,177,952 A | * | 1/1993 | Stone ......................... | 60/39.05 |

* cited by examiner

*Primary Examiner* — Christopher P Ellis
(74) *Attorney, Agent, or Firm* — James M. Kasischke; Michael P. Stanley; Jean-Paul A. Nasser

(57) ABSTRACT

A semiclosed diesel fueled Brayton cycle power system is provided using $CO_2$ and steam as the working fluid. Combustion occurs in a combustor between diesel fuel and $O_2$ with $CO_2$ present as a diluent. During combustion, a heated, high pressure working fluid of $CO_2$ and steam is formed. The heated working fluid is expanded in a turbine and power is withdrawn from the fluid. The fluid is then used in a regenerator to heat cooler, compressed $CO_2$ before the compressed $CO_2$ is transferred to the combustor. The expanded working fluid is cooled conventionally by seawater in a cooler, condensing steam in the working fluid to water. The water is separated from the gaseous $CO_2$. The gaseous $CO_2$ is recycled, and the water is used to backfill the system's diesel fuel tank.

10 Claims, 1 Drawing Sheet

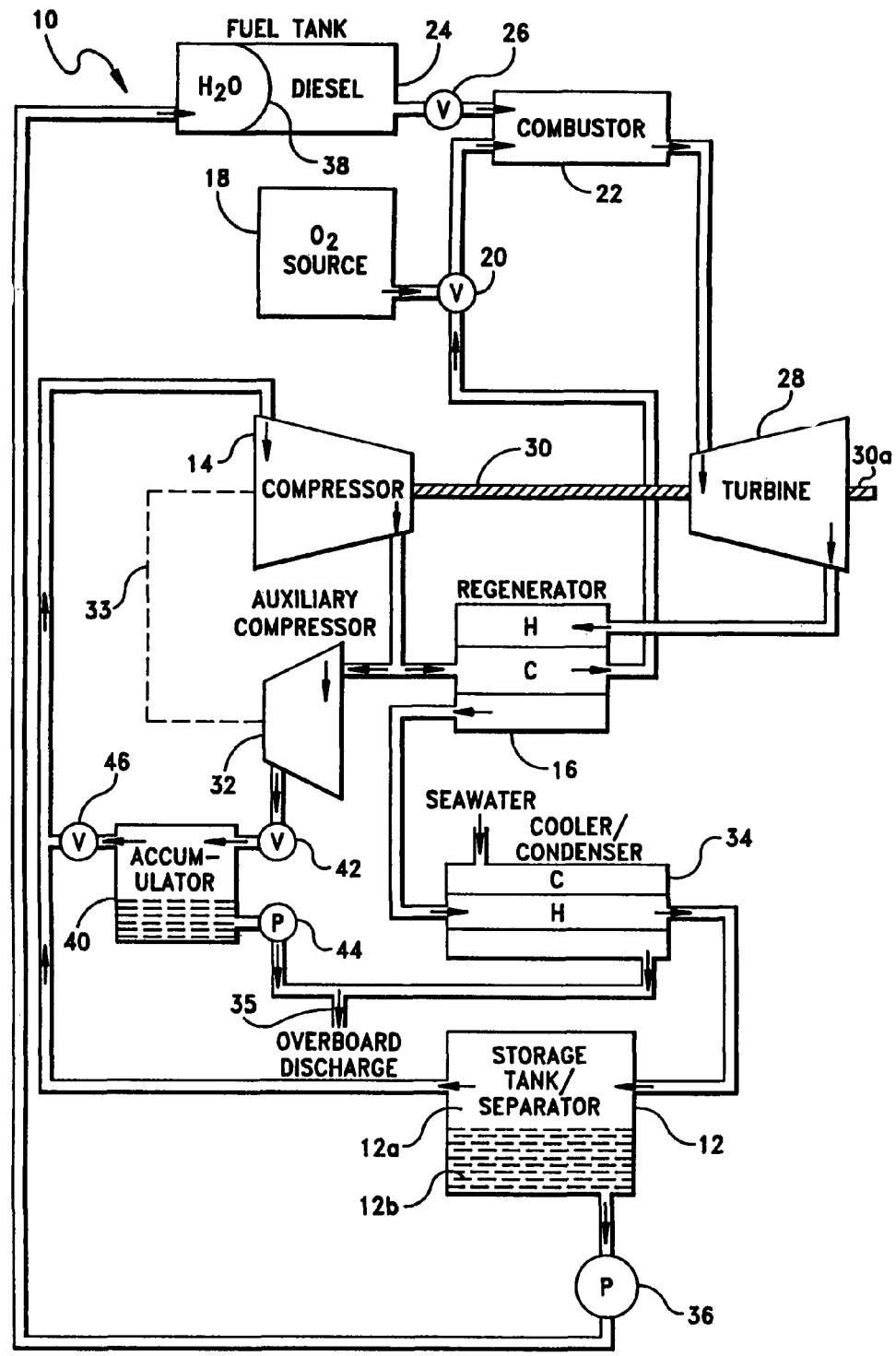

SEMICLOSED BRAYTON CYCLE POWER SYSTEM WITH DIRECT COMBUSTION HEAT TRANSFER

STATEMENT OF GOVERNMENT INTEREST

The invention described herein may be manufactured and used by or for the Government of the United States of America for governmental purposes without the payment of any royalties thereon or therefor.

This patent application is copending with the related applications by the same inventor filed on the same date as subject patent, entitled Closed Cycle Brayton Propulsion System with Direct Heat Transfer, Ser. No. 07/926,116, filed 7 Aug. 1992, Closed Brayton Cycle Direct Contact Reactor/Storage Tank with Chemical Scrubber, Ser. No. 07/926,090, filed 7 Aug. 1992, Closed Brayton Cycle Direct Contact Reactor/Storage Tank with $O_2$ Afterburner, Ser. No. 07/926,200, filed 7 Aug. 1992, and Semiclosed Brayton Cycle Power System with Direct Heat Transfer, Ser. No. 07/926,199, filed 7 Aug. 1992.

BACKGROUND OF THE INVENTION (1) Field of the Invention

The present invention relates to a system and a process for providing power using a semiclosed Brayton cycle with direct heat transfer. More particularly the invention relates to a diesel fueled Brayton cycle system and process using $CO_2$ as a major portion of the working fluid. This system is of particular use in torpedo and unmanned underwater vehicle propulsion systems.

(2) Description of the Prior Art

Current underwater propulsion systems are typically closed Rankine cycle power systems utilizing lithium as a fuel, a chlorofluorocarbon as an oxidant, and water as a working fluid. In a Rankine system, the working fluid is compressed, heated until vaporization, and then expanded through a turbine to produce power. Upon exiting the turbine, the low pressure vapor is condensed to a liquid, and the cycle is repeated. In a typical underwater propulsion system the working fluid is heated as it passes through heat transfer tubes that are wrapped to form a cylindrical annulus within the system's heat exchanger. The center of the cylinder contains liquid metal fuel to heat the working fluid carried by the heat transfer tubes. The working fluid, water, and the liquid metal fuel, lithium, react chemically with one another; therefore, a leak in the heat transfer tubes causes a violent reaction which generates a significant amount of heat and gas resulting in failure of the heat exchanger and the underwater device. Furthermore, should a leak occur in a land based system, the system will release a toxic cloud of LiOH into the environment. Other problems associated with the Rankine cycle include noise generation during the phase change of the working fluid, severe stress of the oxidant injectors due to high reaction zone temperatures, and slow start up time.

An alternative to the closed cycle Rankine power system is a closed or semiclosed Brayton cycle system. In a Brayton cycle, there is no phase change and accordingly, no noise associated therewith. The Brayton cycle is also more efficient than the Rankine cycle despite the fact that more energy is required to compress a gas than to pump an equivalent mass of liquid. Underwater propulsion systems cannot use prior art Brayton cycle systems because the components of the Brayton cycle, principally the conventional Brayton heat exchanger, will not fit in the restricted space available in underwater vehicles.

A compact heat exchanger can be made by increasing gas velocity through the heat exchanger to achieve higher heat transfer coefficients; however, this results in greater heat exchanger pressure drop. Increasing gas velocity is used successfully in Rankine cycle systems because pump power is a small fraction of gross power (1/50) and pump losses are small by comparison. Accordingly, there is no significant reduction in cycle efficiency. In the Brayton cycle, however, compressor power is typically a large part of the gross power (1/2); therefore, small increases in gas velocity and heater pressure drop reduce the Brayton cycle efficiency below that of the Rankine cycle.

My other listed inventions with which this application is copending relate to direct contact closed Brayton cycle power systems using liquid metal fuel. The size and weight penalty of the Brayton's hot side heat exchanger is eliminated by direct contact heat transfer between the working fluid which is an inert gas such as helium, argon, xenon, or a mixture of inert gases, and a liquid metal bath of a material such as lithium, sodium, potassium, aluminum, magnesium, or an alloy.

SUMMARY OF THE INVENTION

Accordingly, it is a general purpose and object of the present invention to provide an improved Brayton cycle power system. A further object of this invention is that the system be compact and capable of higher power densities than the molten metal versions and have the added advantage of burning a hydrocarbon fuel with oxygen.

These and other objects are accomplished with the present invention by providing a semiclosed system utilizing a Brayton cycle. In this invention, combustion occurs in a combustor between diesel fuel and $O_2$ with $CO_2$ present. During combustion, a heated, high pressure working fluid composed of $CO_2$ and steam is formed. The heated working fluid is expanded in a turbine and then used in a regenerator to heat the cooler, compressed $CO_2$ before the $CO_2$ is transferred to the combustor. The expanded working fluid is cooled by a cooler using seawater, condensing steam in the working fluid to water. The gaseous $CO_2$ recycles to the compressor, and the water is used to backfill the system's diesel fuel tank.

BRIEF DESCRIPTION OF THE DRAWINGS

A more complete understanding of the invention and many of the attendant advantages thereto will be readily appreciated as the invention becomes better understood by reference to the following detailed description when considered in conjunction with the accompanying drawing wherein:

FIG. 1 shows a diagram of a semiclosed Brayton cycle with direct combustion heat transfer in accordance with the present invention.

DESCRIPTION OF THE PREFERRED EMBODIMENT

Referring now to FIG. 1 there is shown a semiclosed Brayton cycle power system 10. System 10 has a storage tank/separator 12 containing $CO_2$ 12a and water 12b. $CO_2$ is separated from the water, compressed in a compressor 14, and transported to a regenerator 16 wherein the gas is partially heated. Upon exit from regenerator 16 the partially heated $CO_2$ is mixed with $O_2$ from $O_2$ source 18 by mixing valve 20. The resulting gas mixture is transported to a combustor 22. Diesel fuel from diesel fuel tank 24 is also transported to combustor 22 via fuel control valve 26. Combustion of diesel fuel and oxygen occurs in combustor 22 by conventional means. The $CO_2$ mixed with oxygen acts to reduce the combustion temperature and prevent damage to combustor 22. Combustion results in the formation of a steam and $CO_2$ working fluid. The steam/$CO_2$ working fluid is communicated to a turbine 28 where the working fluid is expanded, driving output shaft 30. Output shaft 30 is mechanically connected to drive compressor 14 and auxiliary compressor 32. Shaft extension 30a allows power to be withdrawn from system 10. The mechanical connection between turbine 28 and auxiliary compressor 32 is symbolically shown by dashed line 33. The steam/$CO_2$ working fluid after being expanded in turbine 28 is routed to regenerator 16. The expanded working fluid preheats the compressed $CO_2$ in regenerator 16 as mentioned previously. Regenerator 16 operates by conventional means. There is no direct contact in regenerator 16 between the $CO_2$ from compressor 14 and the working fluid mixture of steam and $CO_2$. The steam and $CO_2$ working fluid is then transmitted to a cooler/condenser 34 and cooled by large amounts of cold seawater from the environment passing through cooler/condenser 34 and thereby causing condensation of steam in the working fluid to water. The seawater passing through cooler/condenser 34 is discharged to the environment by overboard discharge 35. The cooled working fluid consisting of gaseous $CO_2$ with entrained water droplets then passes to separator/storage tank 12 to separate the water from the $CO_2$. A backfill pump 36 pumps water from separator/storage tank 12 to diesel fuel tank 24 to backfill diesel fuel tank 24. The water is kept separate from the diesel fuel in tank 24 by a membrane or baffles 38. The $CO_2$ remaining is routed back to compressor 14 inlet.

As with any Brayton propulsion system speed and power are regulated by adding or removing mass from the system. Auxiliary compressor 32 is available to remove compressed $CO_2$ from compressor 14 discharge and forward the $CO_2$ to an accumulator 40 through an accumulator input valve 42. Optionally, accumulator 40 is cooled by exposure to the environment allowing the $CO_2$ to liquefy. The $CO_2$ within the system liquefies at 1073 psi and 88° F. Periodically, an excess $CO_2$ pump 44 can discharge excess $CO_2$ from accumulator 40 to the environment via overboard discharge 35. Accumulator output valve 46 expands the accumulated $CO_2$ and allows the accumulated $CO_2$ to be added to compressor 14. For most power levels and depths of operation, neither auxiliary compressor 32 nor excess $CO_2$ pump 44 is required.

There has therefore been described a new direct contact Brayton power system that utilizes exhaust $CO_2$ as the working fluid. Because of its use of hydrocarbon fuel, torpedo room refueling of a recovered underwater vehicle is possible. Eliminating the liquid metal fuels of previous designs reduces environmental hazards and increases community acceptance. This approach has the advantage of high power levels because the hot side heat exchanger is eliminated by the use of combustion by-products as the working fluid. The direct contact combustion of diesel fuel and $O_2$ is a highly developed low risk technology. Very high temperatures are now easily achieved resulting in improved cycle efficiency.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A semiclosed cycle Brayton power system comprising:
    a storage tank/separator containing carbon dioxide;
    a compressor connected to said storage tank/separator to receive and compress said carbon dioxide;
    a regenerator connected to said compressor to receive and to partially heat said compressed carbon dioxide;
    an $O_2$ source connected with said regenerator to mix $O_2$/from said $O_2$ source with said partially heated, compressed carbon dioxide from said regenerator;
    a diesel fuel tank with means for storing water therein separate from diesel fuel provided therein;
    a combustor connected to said regenerator and said $O_2$ source for receiving a mixture of partially heated carbon dioxide and $O_2$, and connected to said diesel fuel tank for receiving diesel fuel, said combustor providing through combustion a heated working fluid mixture of steam and $CO_2$;
    a turbine in communication with said combustor for receiving and expanding said heated working fluid;
    a power transfer means connected to said turbine to allow power to be withdrawn from said power system, said power transfer means being further connected to said compressor to enable said turbine to drive said compressor;
    said regenerator connected to said turbine for receiving said expanded working fluid and utilizing said expanded working fluid for said partial heating of said carbon dioxide;
    a cooler connected to said regenerator for receiving and cooling said expanded working fluid and condensing said working fluid into gaseous carbon dioxide with water droplets entrained therein; and
    said storage tank/separator being connected to said cooler for receiving said water and said gaseous carbon dioxide and separating said water from said gaseous carbon dioxide, said storage tank/separator further being connected to backfill said diesel fuel tank with said separated water.

2. A semiclosed cycle Brayton power system according to claim 1 further comprising:
    an auxiliary compressor, connected to be driven by said turbine, said auxiliary compressor further connected for removing and further compressing a preselected portion of said compressed $CO_2$ from said compressor; and
    an accumulator connected to said auxiliary compressor for receiving, cooling and liquefying said removed $CO_2$ compressed by said auxiliary compressor.

3. A semiclosed cycle Brayton power system according to claim 2 further comprising a pump connected to said accumulator for pumping said liquefied $CO_2$ overboard.

4. A semiclosed cycle Brayton power system according to claim 3 further comprising:
    said compressor being connected to said accumulator for receiving $CO_2$ from said accumulator; and
    a pressure reducing valve connected between said accumulator and said compressor with said accumulator being on the higher pressure side of said pressure reducing valve.

5. A semiclosed cycle Brayton power system according to claim 4 further comprising a flow through valve located between said auxiliary compressor and said accumulator for preventing backflow from said accumulator through said auxiliary compressor.

6. A Brayton cycle process comprising the steps of:
    supplying carbon dioxide gas from a storage tank/separator to a compressor;
    compressing said carbon dioxide gas in said compressor;
    preheating said compressed carbon dioxide in a regenerator;

mixing said heated, compressed carbon dioxide with oxygen;

combusting said oxygen in said oxygen and heated carbon dioxide mixture with diesel fuel in a combustor to form a hot, high pressure steam and carbon dioxide working fluid;

expanding said hot, high pressure working fluid in a turbine to extract energy therefrom;

supplying said hot, expanded working fluid to said regenerator for preheating said compressed carbon dioxide;

cooling said expanded working fluid in a cooler/condenser to form gaseous carbon dioxide with water droplets entrained therein;

separating said water droplets from said carbon dioxide gas in said storage tank/separator;

recirculating said carbon dioxide; and pumping said separated water from said storage tank/separator to a diesel fuel tank to backfill said diesel fuel tank.

7. A Brayton cycle process according to claim 6 comprising the additional steps of:

further compressing a portion of said compressed carbon dioxide gas from said compressor; and liquefying said further compressed carbon dioxide gas in an accumulator.

8. A Brayton cycle process according to claim 7 comprising the additional step of pumping said liquefied $CO_2$ overboard for removing said liquefied $CO_2$ from the system.

9. A Brayton cycle process according to claim 7 comprising the additional steps of:

expanding said liquefied carbon dioxide from said accumulator; and reintroducing said expanded, accumulated carbon dioxide to said compressor.

10. A Brayton cycle process according to claim 9 comprising the additional step of pumping said liquefied $CO_2$ overboard for removing said liquefied $CO_2$ from the system.

* * * * *